April 15, 1924.
S. G. CRANE
APPLIANCE FOR ILLUMINATING WEIGHING SCALES
Filed Oct. 7, 1918
1,490,418
2 Sheets-Sheet 1
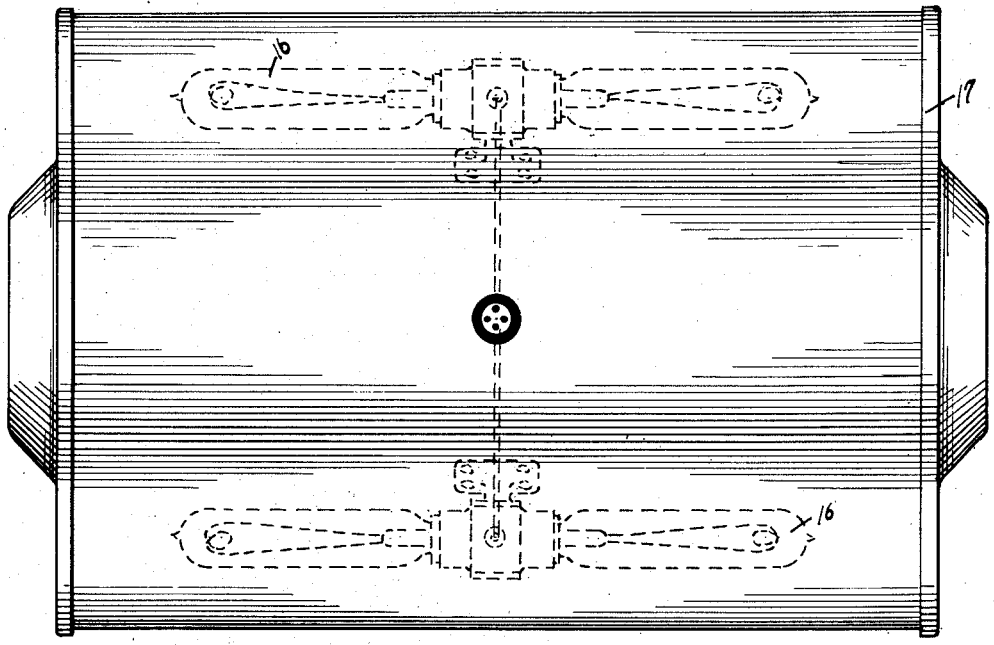
Fig. 4.
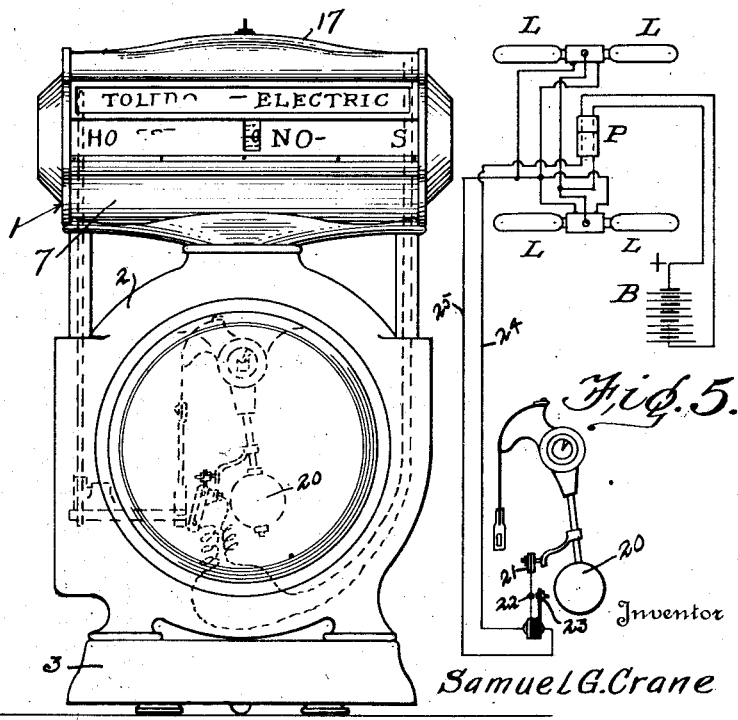
Fig. 1.
Fig. 5.
Witness
Inventor
Samuel G. Crane
By George R. Frye
Attorney April 15, 1924.   1,490,418
S. G. CRANE
APPLIANCE FOR ILLUMINATING WEIGHING SCALES
Filed Oct. 7, 1918   2 Sheets-Sheet 2

Witness
H. Lybrand
C. E. Wilcox

Inventor
Samuel G Crane
By
George R. Frye
Attorney

Patented Apr. 15, 1924.

1,490,418

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

APPLIANCE FOR ILLUMINATING WEIGHING SCALES.

Application filed October 7, 1918. Serial No. 257,097.

*To all whom it may concern:*

Be it known that I, SAMUEL G. CRANE, a citizen of the United States, residing at Toledo, in the county of Lucas and State of Ohio, have invented certain new and useful Improvements in Appliances for Illuminating Weighing Scales, of which the following is a specification.

My invention is an improvement in that class of apparatus which has for its purpose the illumination of the index chart of a scale or similar device which permits it to be accurately and easily read when in use even though the scale may be located at a point where it receives little natural light. The illuminating apparatus may also be arranged to afford a desirable advertising feature by lighting a sign or signs visible to the buyer of the material being weighed while the weighing operation is being carried on.

My appliance is particularly applicable to that type of weighing scales known as cylinder scales, because of the fact that the chart is printed upon a sheet which is rolled into cylindrical form and supported on a central shaft so as to be rotated during the weighing process for the purpose of presenting opposite the reading line of the chart appropriate weight and price indications. In such scales the reading line usually consists of a wire stretched longitudinally of the cylinder and in close proximity to its surface, said wire serving to direct the eye accurately to the indication which is to be read. In illuminating such a chart it is very essential that the light shall not come from such a direction as to cast the shadow of the reading wire upon the chart at a point close to the true indication, since the eye may be confused by the shadow and mistake it for the wire itself. The lighting of such scales in the types now on the market is produced by electric lamps located within the casing of the chart itself and closely adjacent the chart, such constructions being quite disadvantageous in confining the heat of the lamps within the casing, causing more or less warping of the chart and irregular expansion of the scale parts in proximity to the lights. My invention overcomes the difficulties referred to and affords many advantages in efficiency, convenience and mechanical construction, as will be apparent from the following description.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is an end view of a cylinder scale equipped with my improved illuminating appliance;

Figure 4 is a plan view of the scale; and

Figure 5 is a diagram of the wiring involved in the operation of the electrical parts entering into the illumination of the scale.

Figure 2:
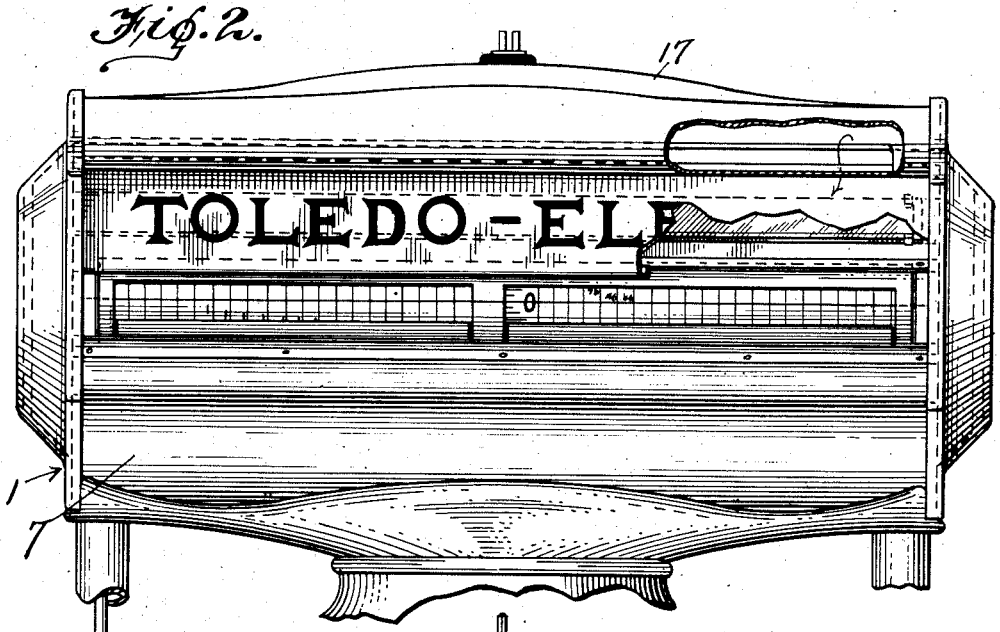
Figure 2 is an enlarged front view of the upper portion of the scale containing the chart and illuminating mechanism.

The scale consists of an upper casing 1 for the chart or other index means, herein shown as of substantially cylindrical character and supported in operative relation to the other parts of the scale on a housing 2 containing a pendulum 20 or similar counterbalancing means and in turn supported upon a base 3 enclosing the scale levers. The index 4 preferably consists of a graduated peripheral chart 5 and spiders 6 and has its central shaft pivotally mounted in the usual manner in the casing 1, and may be operatively connected to the scale levers in any desirable manner. The casing 1 consists primarily of a member 7 of substantially cylindrical shape conforming in dimension quite closely to the outer surface of the chart 4 and provided on each side with an inclined lighting window 8 containing a clear glass pane 9 and a reading window 10, glazed either with plain glass 11 or with a magnifying lens 12, through which the indications of the scale may be read by the customer and by the merchant, reading wires 13 being mounted closely adjacent the chart in V-notched members 14, 14 attached to the casing 1 behind the reading windows 10. Outside the casing 1 and above the lighting windows 8 are centrally mounted lamp sockets 15, each supporting oppositely-directed electric lamps 16 preferably of cylindrical and extended shape, said lamps being located so that their light rays will pass through the lighting windows 9, 9 tangentially of the chart at a point opposite the reading wires 13, 13, the location of the lamps being such as to brightly illuminate the surface of the chart adjacent the reading line and to throw the shadow of the reading wire 13 away from the immediate vicinity of that part of the chart, thus providing an evenly and brightly illuminated space on the chart where the weight indication is to be read. Above the casing 1 is arranged a cover portion 17 partially surrounding the inner member 7 and extending outwardly and downwardly around the lamps 16 so as to prevent the direct rays from the electric lamps from reaching the cylinder and also permit translucent signs, such as 18, of any desired nature, to be placed outside the lamps at such points as to be presented brilliantly to the eye when illuminated by the lamps 16. Suitable reading matter of an advertising, instructive, or similar nature may be marked upon the signs so as to attract attention to the illuminated scale. The cover portion 17 is spaced from the casing 7 a sufficient distance to provide a free circulation of air around the lamps 16 for the dissipation of the heat generated and prevent its heating up the space within the casing 1 in which the chart 4 is located. To facilitate the movement of air through this space, ventilating openings 19, 19 are provided at the sides of the cover portion 17 above and outward of the lamps so that the heated air adjacent the lamps will pass out of said openings to the open. These ventilating openings are preferably located in a reentrant angle of said housing where they will not be visible from the outside to the merchant or customer.

The clear glass illuminating windows 9, while perfectly transparent to light, are partially non-diathermanous, and, owing to these characteristics, they permit substantially all the light which falls upon them to pass through and illuminate the chart, but at the same time they screen off the major portion of the radiant heat which would otherwise fall upon the chart and cause warping and distortion.

An additional convenience afforded by the spaced construction above described is the possibility of removing one or more of the lamps and substituting others without opening any part of the casing enclosing the chart 4, thus avoiding the possibility of the entrance of dust thereto or accidental injury of the chart.

Figure 3:
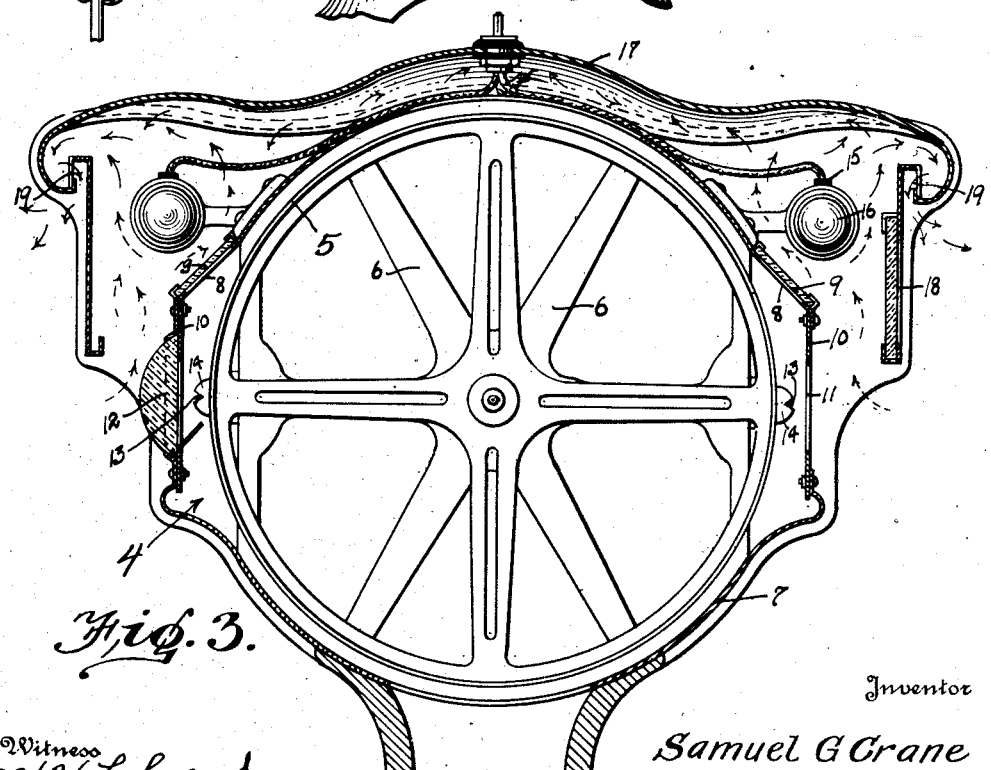
Figure 3 is a transverse section taken substantially centrally of Figure 2.

The electric lamps are preferably illuminated only during the weighing process in order to conserve energy and attract attention by the flashing of the light at the moment when the article to be weighed is placed upon the scale, and this may be done automatically by arranging the circuit of the lamps through a switch operated from the pendulum of the counterbalancing mechanism, substantially as illustrated in Figure 5, where 20 is the pendulous counterbalancing device, 21 a spring switch member carrying a part normally engaged by said pendulum and a contact member 22 normally spaced from but adapted to register with a fixed contact member 23 whenever the pendulum swings from its normal position, the two sides of the electric circuit 24 and 25 being respectively connected to said contact members 22 and 23 and passing in the usual manner through lamps L, L, L, L in multiple to the connecting plug P and the source of electric current B. The connecting plug may conveniently be mounted in the cover portion 17 and the wires leading to the lamps arranged between the cover portion and the casing 7 (see Figure 3).

In the operation of this device, when an article is placed upon the platform the counterbalancing pendulum will be moved upwardly to an extent dependent on the weight of the article and its departure from the zero position will permit contact to be made between contact members 22 and 23, thus closing the circuit of the electric lights, which will at once be lighted, illuminating the chart in the desired manner at the point opposite the reading wire and also illuminating the translucent signs 18.

While it will be apparent that the illustrated embodiment of my invention herein disclosed is well calculated to adequately fulfill the objects primarily stated, it is to be understood that the invention is suceptible to variation, modification and change without departing from the spirit and scope of the invention as set forth in the subjoined claims.

Having described my invention, I claim:

1. In a weighing scale and in combination with the chart thereof, a casing surrounding the chart and having a reading window opposite the reading line of said chart, and an inclined glazed partially non-diathermanous illuminating window above said reading window, an electric lamp adapted to illuminate the chart by rays of light passing through said illuminating window and striking said chart in a direction closely tangential to the surface of the chart at the reading line, and means for shielding the eye from direct rays of said lamp.

2. In a weighing scale and in combination with the chart thereof, a casing having an illuminating window, electric lamps arranged in spaced relation outside of said casing for illuminating the surface of said chart through said window, and a hood arranged above said lamps and casing and spaced from said lamps a sufficient distance to permit a free circulation of air around said lamps, said hood being provided with ventilating openings above and forwardly of said lamps, said openings being arranged at a reentrant angle out of view of the operator of the scale.

3. In a weighing scale, in combination, a chart, a casing surrounding said chart, a reading window in said casing, a glazed illuminating window in said casing, and concealed illuminating means mounted exteriorly of said casing and adapted to illuminate said chart through said illuminating window.

4. In a weighing scale, in combination, a chart, a casing surrounding said chart, a magnifying reading window in said casing, a lamp mounted exteriorly of said casing, a ventilating cover for said lamp, and a glazed illuminating window in said casing substantially perpendicularly disposed with respect to the rays of said lamp and so located as to transmit rays nearly tangential to the surface of said chart.

SAMUEL G. CRANE.

Witnesses:
FRANCES DOYLE,
C. E. WILCOX.